(12) United States Patent
Harless et al.

(10) Patent No.: US 9,078,394 B2
(45) Date of Patent: Jul. 14, 2015

(54) CUTTING HEAD FOR STRING TRIMMER

(75) Inventors: Daniel E. Harless, King City, CA (US); David K. Harless, Clovis, CA (US)

(73) Assignee: Ambush Heads, LLC, Clovis, CA (US)

( * ) Notice: Subject to any disclaimer, the term of this patent is extended or adjusted under 35 U.S.C. 154(b) by 329 days.

(21) Appl. No.: 13/244,241

(22) Filed: Sep. 23, 2011

(65) Prior Publication Data

US 2012/0246945 A1 Oct. 4, 2012

Related U.S. Application Data

(60) Provisional application No. 61/386,301, filed on Sep. 24, 2010.

(51) Int. Cl.
*A01D 34/01* (2006.01)
*A01D 34/416* (2006.01)
*A01D 43/16* (2006.01)
*A01D 34/73* (2006.01)

(52) U.S. Cl.
CPC .............. *A01D 34/416* (2013.01); *A01D 34/73* (2013.01); *A01D 43/16* (2013.01)

(58) Field of Classification Search
USPC ............. 30/276, 347; 56/255, 295, 12.7, 17.2
See application file for complete search history.

(56) References Cited

U.S. PATENT DOCUMENTS

| | | | |
|---|---|---|---|
| 4,790,071 A | 12/1988 | Helmig | |
| 4,856,194 A * | 8/1989 | Lee | 30/276 |
| 5,406,708 A | 4/1995 | Stephens | |
| 5,430,943 A | 7/1995 | Lee | |
| 5,493,785 A | 2/1996 | Lawrence | |
| 5,617,636 A * | 4/1997 | Taggett et al. | 30/276 |
| 5,651,418 A | 7/1997 | Jerez | |
| 6,032,369 A * | 3/2000 | Tada et al. | 30/276 |
| 6,293,350 B1 | 9/2001 | Paolo | |
| 6,349,475 B1 | 2/2002 | Buck | |
| 6,378,215 B1 * | 4/2002 | Carman | 30/192 |
| 6,427,341 B1 | 8/2002 | Lee | |
| 6,446,346 B1 | 9/2002 | Castleman | |
| 6,722,114 B1 | 4/2004 | Poole | |
| 6,817,102 B2 * | 11/2004 | Harris et al. | 30/276 |
| 6,912,789 B2 | 7/2005 | Price, III | |
| 7,587,829 B2 * | 9/2009 | King et al. | 30/346.54 |
| 7,661,252 B2 | 2/2010 | Kitamura | |
| 7,743,511 B2 * | 6/2010 | Jerez | 30/276 |
| 7,827,771 B2 | 11/2010 | Hishida | |
| 7,913,401 B2 | 3/2011 | Iacona | |
| 8,307,559 B2 * | 11/2012 | Tomita | 30/276 |
| 2009/0038163 A1 * | 2/2009 | Jerez et al. | 30/276 |
| 2010/0132200 A1 * | 6/2010 | Tomita | 30/276 |
| 2010/0192386 A1 * | 8/2010 | Hause et al. | 30/276 |
| 2011/0214295 A1 * | 9/2011 | Proulx | 30/276 |
| 2011/0258861 A1 * | 10/2011 | Andrews et al. | 30/276 |

* cited by examiner

*Primary Examiner* — Omar Flores Sanchez (74) *Attorney, Agent, or Firm* — Fitch, Even, Tabin & Flannery LLP (57) ABSTRACT

A cutting head for a string trimmer, the cutting head being rotationally driven through a drive shaft, the cutting head comprising a bowl; a trimmer string secured to the bowl; and a blade attached to the outer circumference of the bowl.

15 Claims, 10 Drawing Sheets

CUTTING HEAD FOR STRING TRIMMER

This application claims the benefit of U.S. Provisional Application No. 61/386,301, filed Sep. 24, 2010, for "BLADE ASSEMBLY FOR WEED TRIMMER MACHINES," which is incorporated in its entirety herein by reference.

FIELD OF INVENTION

This invention relates to string trimmer and more specifically to a cutting head for a string trimmer.

BACKGROUND

A string trimmer ("weed whacker") is a handheld device which uses a flexible line ("trimmer string") to cut grass and other vegetation close to objects such as trees or pavement.

Typically, weed whackers comprise a cutting head at the end of a long shaft, and a handle. A trigger on the handle controls the speed of the cutting head containing trimmer string. The weed whacker may be powered by an internal combustion engine, an electric motor or a battery. Cutting is performed by the trimmer string which becomes stiff and extends horizontally outward as a result of centripetal forces when the cutting head rotates. The faster the cutting head rotates, the stiffer the trimmer string becomes. The cutting head often includes a safety shield on the user side and a rotating hub, or spool.

Many users find weed whackers difficult to operate and inefficient. Often, trimmer string must be hand-wound onto a spool before use. During use, the trimmer string may break off and the user may need to release additional trimmer string to replace the spent portion. Trimmer string may also become tangled or may break apart inside the safety shield. Trimmer string is often inadequate to cut thick vegetation and a user must switch between multiple gardening tools. Gardening often requires saw blades for cutting thick vegetation and earth tilling functions which are not available in ordinary weed whackers.

SUMMARY OF THE PRESENT INVENTION

A cutting head for a string trimmer, the cutting head being rotationally driven through a drive shaft, the cutting head comprising a bowl, at least one trimmer string secured to the bowl is presented. The cutting head provides at least one blade attached to the outer circumference of the bowl, wherein the blades are angled downward away from the trimmer strings. The cutting head, in accordance with one embodiment, further comprising at least one trimmer string mount, the trimmer string mount being secured to the top surface of the bowl and including at least one hole for attachment of the trimmer string a vertical distance above the top surface of the bowl, the trimmer string mount positioned to operate as an agitator for dispersing vegetation. The cutting head, in some variations, includes a bottom fastener ring for clamping the blade between the outer circumference of the bowl and the bottom fastener ring. In accordance with one variation, tilting the bowl adjusts the downward angle of the blades, and the height of the bowl raises the blades a distance above a cutting surface. The blade, in accordance with one variation, is composed of a spark free material. In accordance with one variation, the blade is composed of stainless steel. The blade, in accordance with one variation, is removable. In accordance with one variation, the blade is interchangeable. The blade, in accordance with one variation, is coated with ceramic wear resistant coating. The trimmer string, in accordance with one variation, is composed of nylon. The trimmer string, in accordance with one variation, is secured to the top surface of the outer diameter of the bowl. The trimmer string, in accordance with one variation, is secured to the bottom surface of the outer diameter of the bowl. In accordance with one variation, the trimmer string and the blade cut a single piece of vegetation together.

In one embodiment, a cutting head for a string trimmer, the cutting head being rotationally driven through a drive shaft, the cutting head comprising a bowl, a trimmer string secured to the bowl, and a removable attachment attached to the outer circumference of the bowl is presented. The removable attachment, in accordance with one embodiment, includes a stainless steel brush. The removable attachment, in accordance with one embodiment, includes a fiber brush. The removable attachment, in accordance with one embodiment, includes a fine tooth manicuring blade. The removable attachment, in accordance with one embodiment, includes a flat toothless trimmer blade. The removable attachment, in accordance with one embodiment, includes a blower fan blade. The cutting head, in accordance with one embodiment, further comprises a trimmer string mount, the trimmer string mount being secured to the top surface of the bowl and including a hole for attachment of the trimmer string a vertical distance above the top surface of the bowl, the trimmer string mount positioned to operate as an agitator for dispersing vegetation. The cutting head, in some variations, includes a bottom fastener ring for clamping the attachment between the outer circumference of the bowl and the bottom fastener ring. In accordance with one variation, tilting the bowl adjusts the downward angle of the blade, and the height of the bowl raises the blade a distance above a cutting surface. The attachment, in accordance with one variation, is composed of a spark free material. In accordance with one variation, the attachment is composed of stainless steel. The attachment, in accordance with one variation, is removable. In accordance with one variation, the attachment is interchangeable. The attachment, in accordance with one variation, is coated with ceramic wear resistant coating. The trimmer strings, in accordance with one variation, are composed of nylon. The trimmer strings, in accordance with one variation, are secured to the top surface of the outer diameter of the bowl. The trimmer strings, in accordance with one variation, are secured to the bottom surface of the outer diameter of the bowl. In accordance with one variation, the trimmer string and the attachment cut a single piece of vegetation together.

In one embodiment, a cutting head for a string trimmer, the cutting head being rotationally driven through a drive shaft, the cutting head comprising a generally cylindrical disc including a ring of downward facing blades and a bowl secured to the bottom of the generally cylindrical disc is presented. The cutting head provides at least one agitator mounted on the top surface of the generally cylindrical disc. In accordance with one embodiment, the cutting head is configured to be attached to a machine comprising trimmer strings. In accordance with one variation, tilting the bowl adjusts the downward angle of the blade, and the height of the bowl raises the blade a distance above a cutting surface. In accordance with one variation, the blade is composed of a spark free material. In accordance with one variation, the blade is composed of stainless steel. In accordance with one variation, the blade is removable. In accordance with one variation, the blade is interchangeable. The blade, in accordance with one variation, is coated with ceramic wear resistant coating.

DETAILED DESCRIPTION OF THE PREFERRED EMBODIMENTS

There is a need for cutting heads for string trimmers, which provide trimmer strings as well as saw blades for cutting thick vegetation and earth tilling functions in one string trimmer machine.

In accordance with some embodiments, a cutting head for a string trimmer having the ability to perform trimmer string, saw blade and earth tiller functions in one machine is provided.

In accordance with some embodiments, a cutting head for a string trimmer having the ability to adjust a downward angle of earth tilling blades through tilting a bowl of the cutting head is provided.

In accordance with some embodiments, a cutting head for a string trimmer having the ability to agitate vegetation and provide more efficient cutting through the use of agitators is provided.

In accordance with some embodiments, a cutting head for a string trimmer having removable blades which are interchangeable and may be replaced with various attachments is provided.

In accordance with some embodiments, a cutting head for a string trimmer having the ability to utilize trimmer strings and blades simultaneously to more efficiently cut vegetation is provided.

In accordance with some embodiments, a cutting head for a string trimmer having the ability to be mounted to a string trimmer machine with a bowl of the cutting head either upward facing or downward facing is provided.

Figure 1:
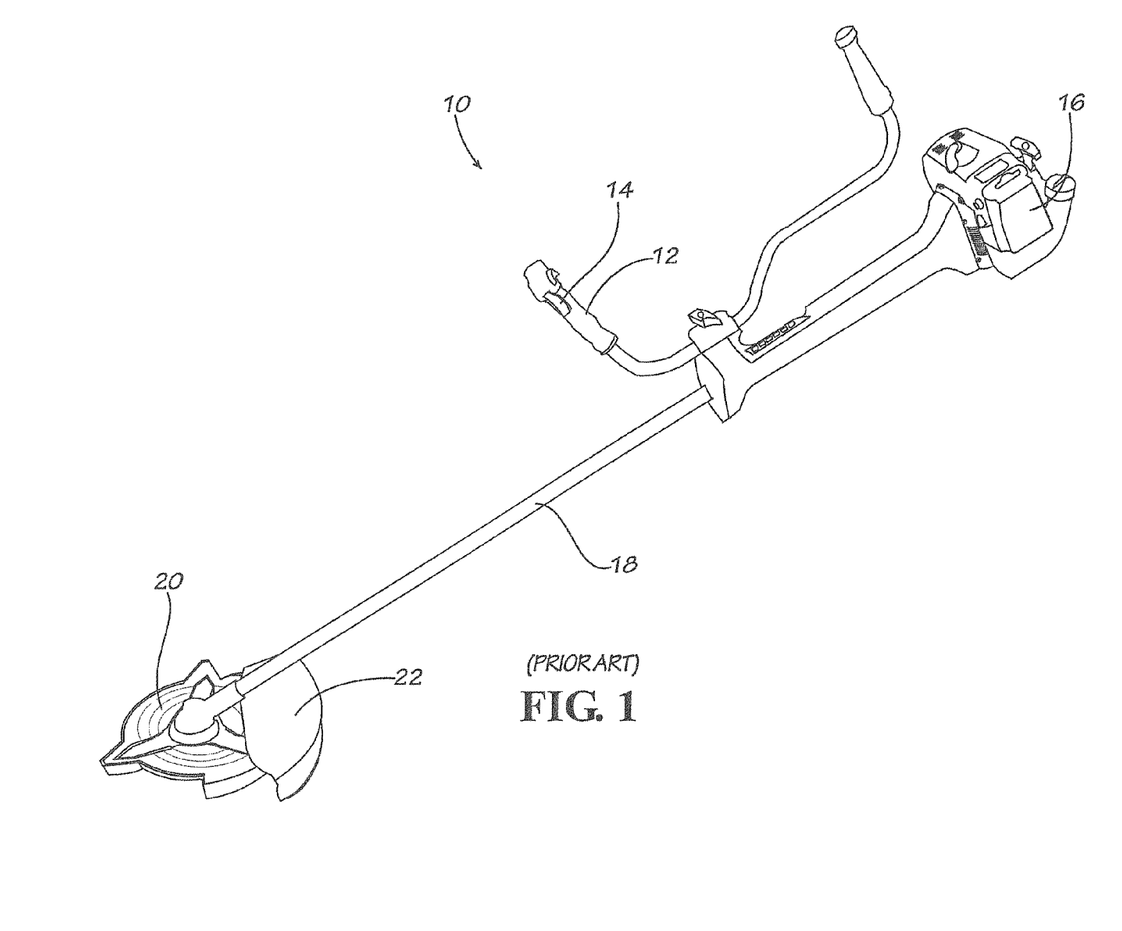
FIG. 1 is a front elevational view of a string trimmer.

Referring now to FIG. 1, shown is a front elevational view of a string trimmer 10, including a handle 12 having a trigger 14, a power pack 16, a shaft 18, a cutting head 20, and a safety shield 22.

The power pack 16 and handle 12 including the trigger 14 are attached to the shaft 18. The shaft 18 is connected to the cutting head 20 and the safety shield 22.

In operation, the cutting head 20 is powered by the power pack 16. The rotational speed of the cutting head 20 is adjusted by the trigger 14 on the handle 12. The safety shield 22 prevents cut vegetation from flying upward.

Figure 2:
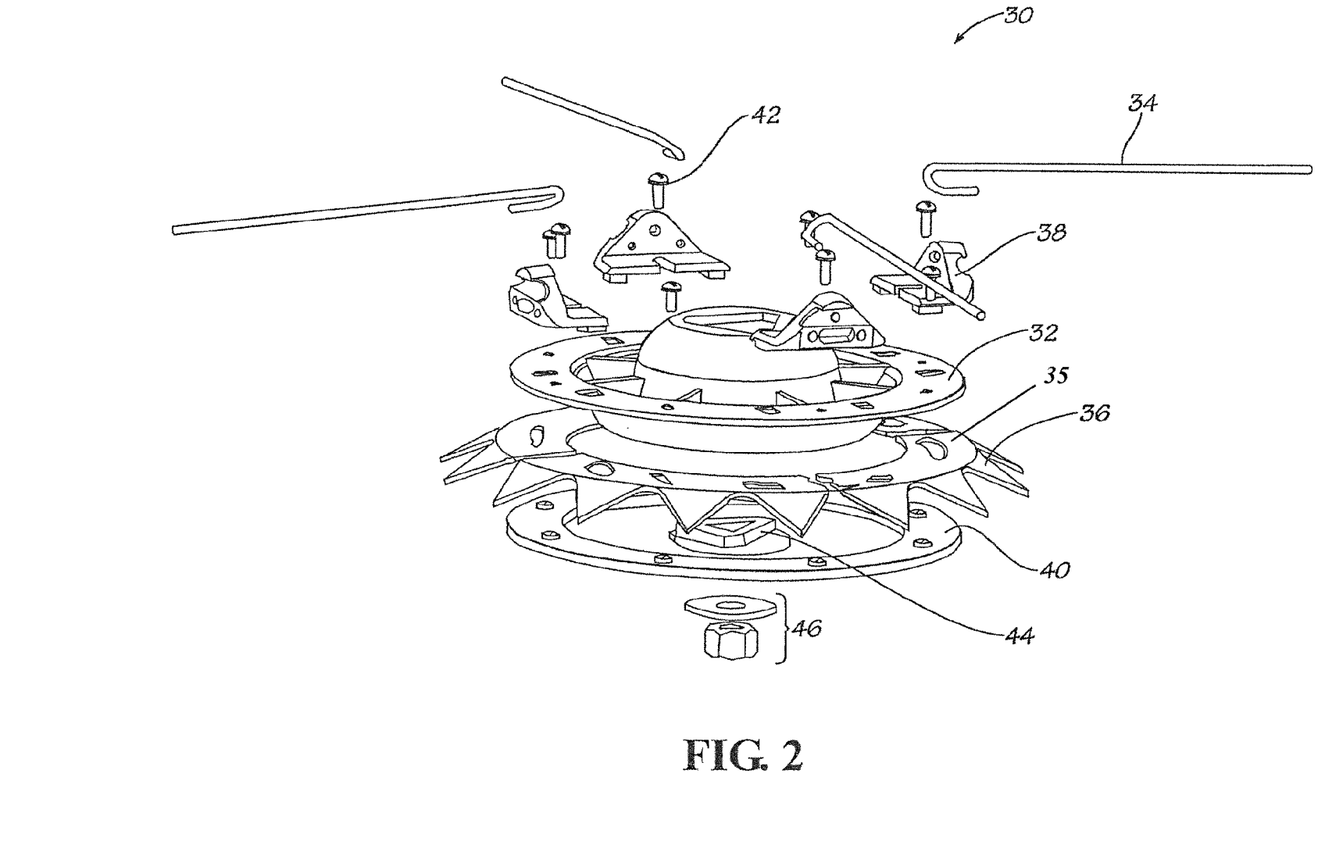
FIG. 2 is a front unassembled elevational view of a cutting head for a string trimmer according to an embodiment of the present invention.

Referring to FIG. 2, shown is a front unassembled elevational view of a cutting head for a string trimmer 30, including a generally cylindrical bowl 32, trimmer strings 34, removable attachment 35 including blades 36, trimmer string mounts 38, a bottom fastener ring 40, trimmer string mount screws 40, an adapter washer 44, and a nut and washer adapter kit 46.

The trimmer strings 34 are attached to the generally cylindrical bowl 32 by the trimmer string mounts 38 and the trimmer string mount screws 42. The disc-shaped removable attachment 35 including blades 36 extending from an outer diameter thereof is clamped between the outer circumference of the bowl 32 and the bottom fasten ring 40. The adapter washer 44 and nut and washer adapter kit 46 secure the bowl 32 and bottom fastener ring 40 together.

In operation, as the cutting head 30 is rotated, the trimmer strings 34 become stiff and extend outward to cut vegetation. The blades 36 also cut vegetation and may cut thicker vegetation than may be cut by the trimmer strings 34. The bowl 32 acts as a fulcrum to provide a user with control over the downward angle of the blades 36 into the earth when earth tilling functions are desired. The blades 36 may extend only slightly into the earth when edger functions are desired. For example, tilting the bowl 32 at a forty-five degree angle may cause the blades 36 to extend half of the blade length into the earth. Tilting the bowl 32 at a thirty degree angle may cause the blades 36 to extend one-quarter of the blade length into the earth. The height of the bowl 32 raises the blades 36 a distance above a cutting surface. The blades 36 and trimmer strings 34 also work together to produce a "tail whip effect," wherein the trimmer strings 34 wrap around or whip around thicker vegetation to bring the thicker vegetation into the blades 36. Veins located in the center of the bowl 32 act to blow grass and debris off of the bowl 32 and blades 36.

Figure 3:
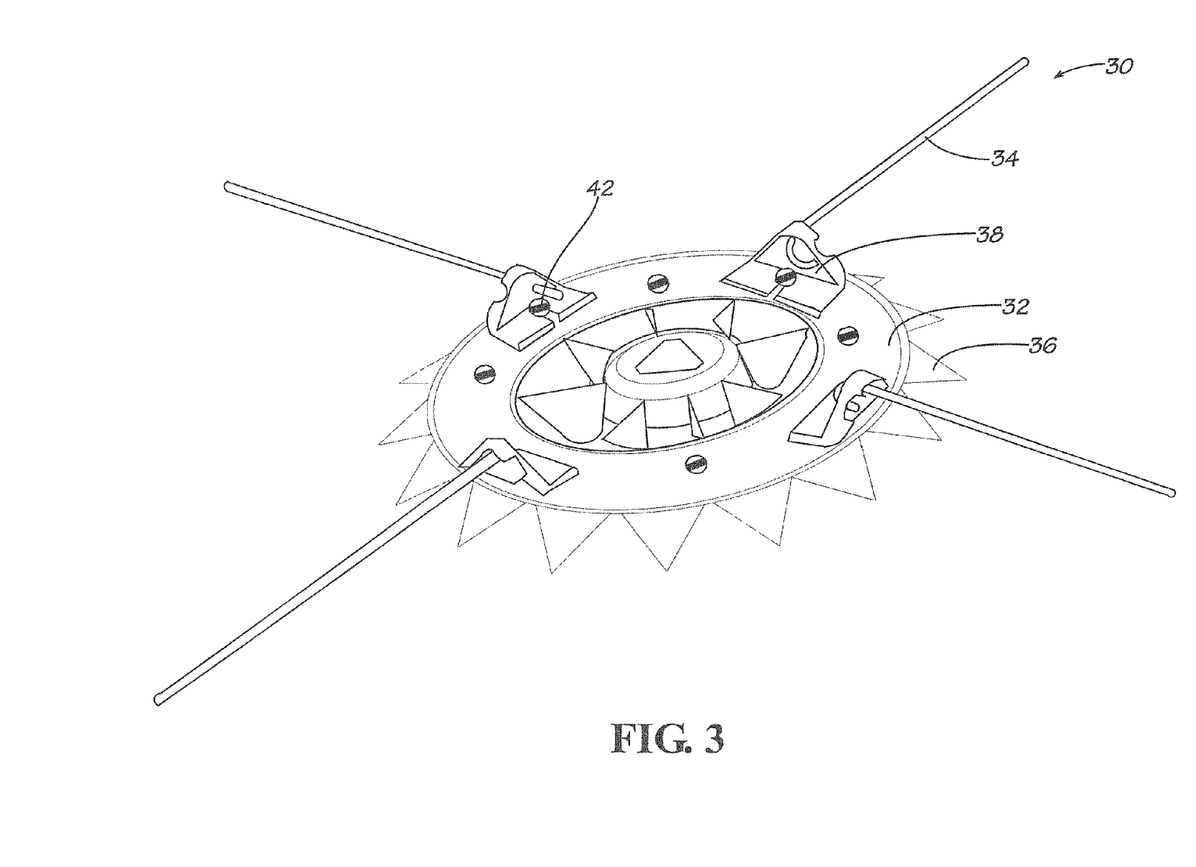
FIG. 3 is an assembled elevational view of the cutting head of FIG. 2 according to an embodiment of the present invention.

Referring to FIG. 3, shown is an assembled elevational view of the cutting head of FIG. 2.

Figure 4A:
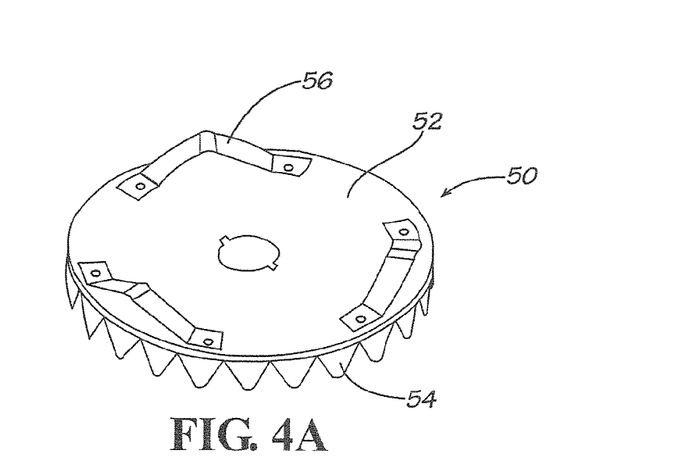
FIG. 4A is a front elevational view of a cutting head according to an embodiment of the present invention.
Figure 4B:
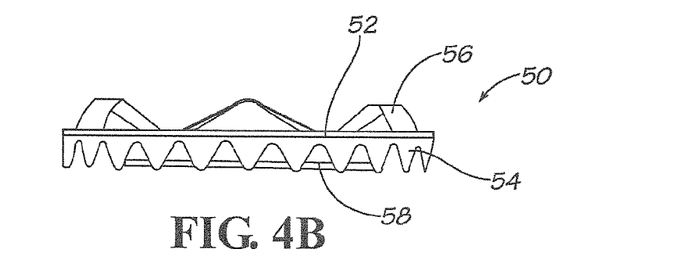
FIG. 4B is a side view of the cutting head of FIG. 4A according to an embodiment of the present invention.
Figure 4C:
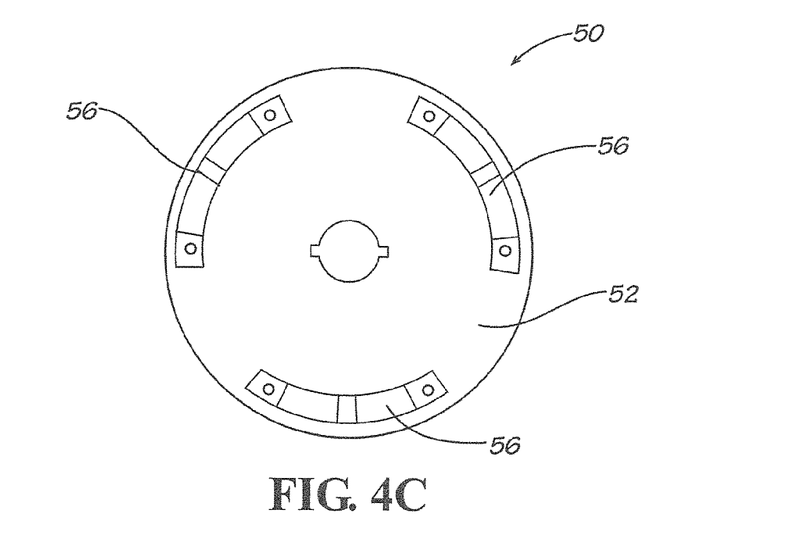
FIG. 4C is top view of the cutting head of FIG. 4A according to an embodiment of the present invention.

Referring to FIGS. 4A-4C, shown are front elevational, side and top view of a cutting head 50, including a generally cylindrical disc 52 including a ring of downward facing blades 54, at least one agitator 56, and a generally cylindrical bowl 58.

The ring of downward facing blades 54 are attached to outer circumference of the generally cylindrical disc 52. The generally cylindrical bowl 58 is attached to the bottom surface of the generally cylindrical disc 52. The at least one agitator 56 is attached to the top surface of the generally cylindrical disc 52.

In operation, as the cutting head 50 is rotated, the blades 54 cut vegetation. The bowl 58 acts as a fulcrum to provide a user with control over the downward angle of the blades 54 into the earth when earth tilling functions are desired. The blades 54 may extend only slightly into the earth when edger functions are desired. For example, tilting the bowl 58 at a forty-five degree angle may cause the blades 54 to extend half of the blade length into the earth. Tilting the bowl 58 at a thirty degree angle may cause the blades 54 to extend one-quarter of the blade length into the earth. The height of the bowl 58 raises the blades 54 a distance above a cutting surface.

Figure 5A:
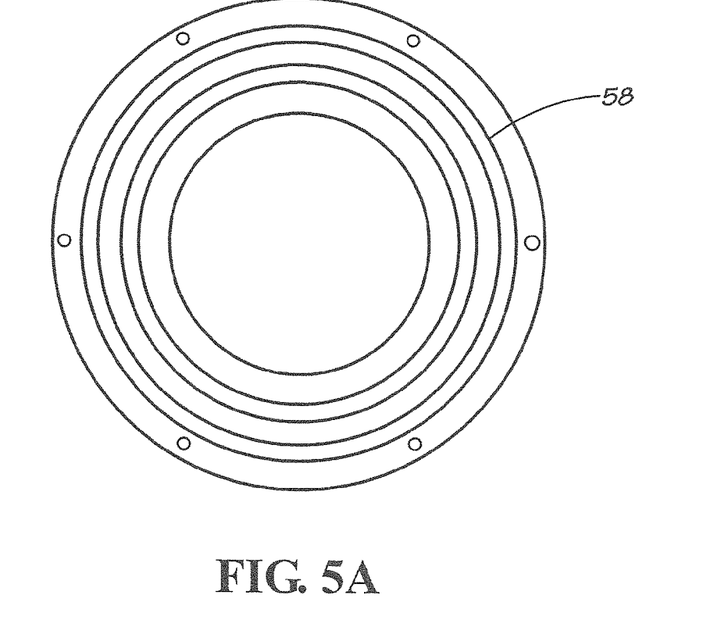
FIG. 5A is a top view of the bowl of FIG. 4A. according to an embodiment of the present invention.
Figure 5B:
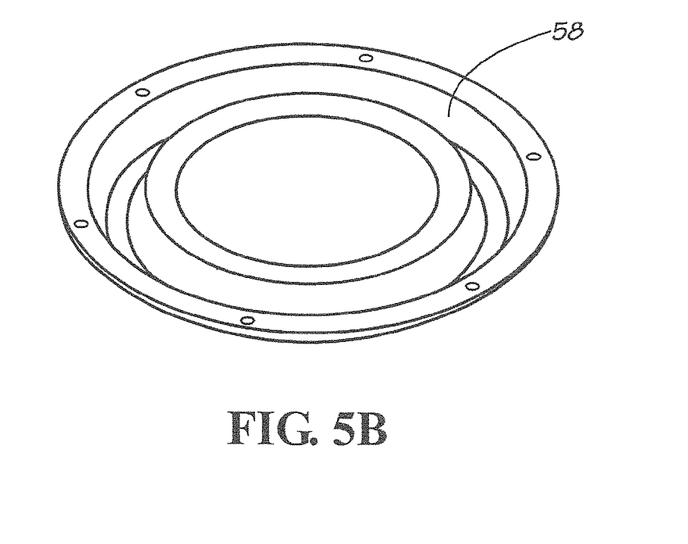
FIG. 5B is an elevational view of the bowl of FIG. 4A according to an embodiment of the present invention.

Referring to FIGS. 5A-B, shown is a top and an elevational view of the bowl of FIG. 4A.

Figure 6:
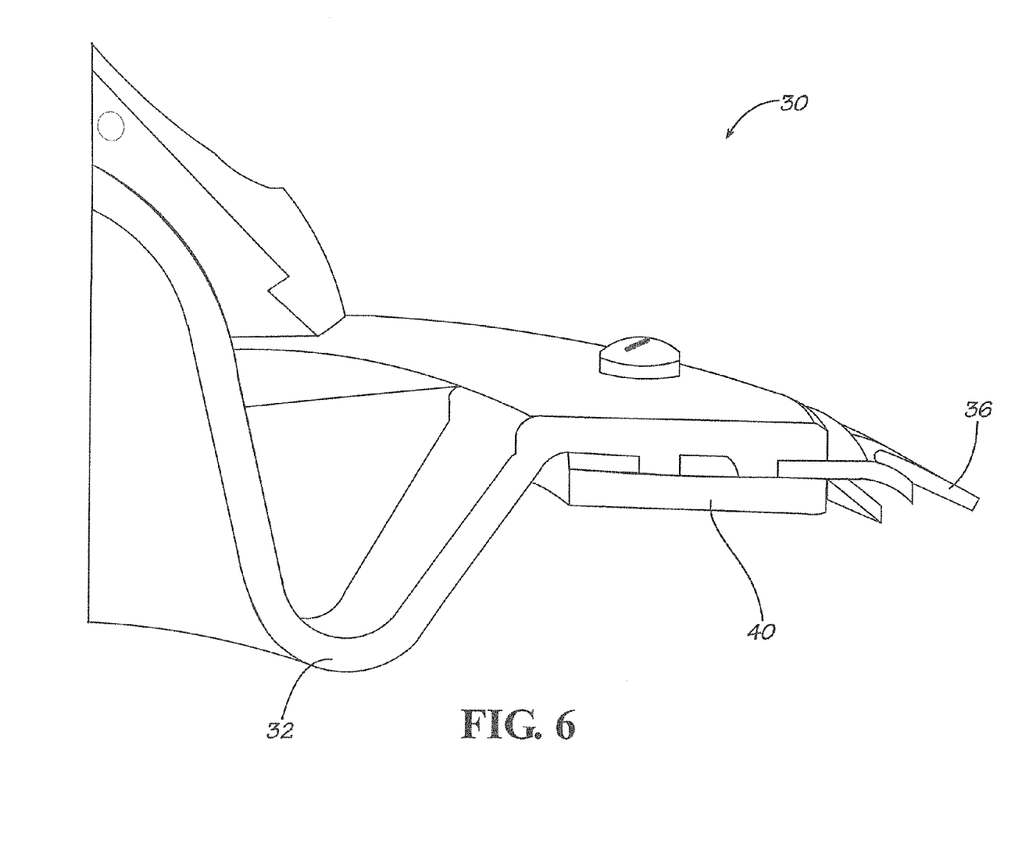
FIG. 6 is a side view of the cutting head of FIG. 2 showing clamping of the blade according to an embodiment of the present invention.

Referring to FIG. 6, shown is a partial side view of the cutting head of FIG. 2 showing clamping of the blade.

Figure 7:
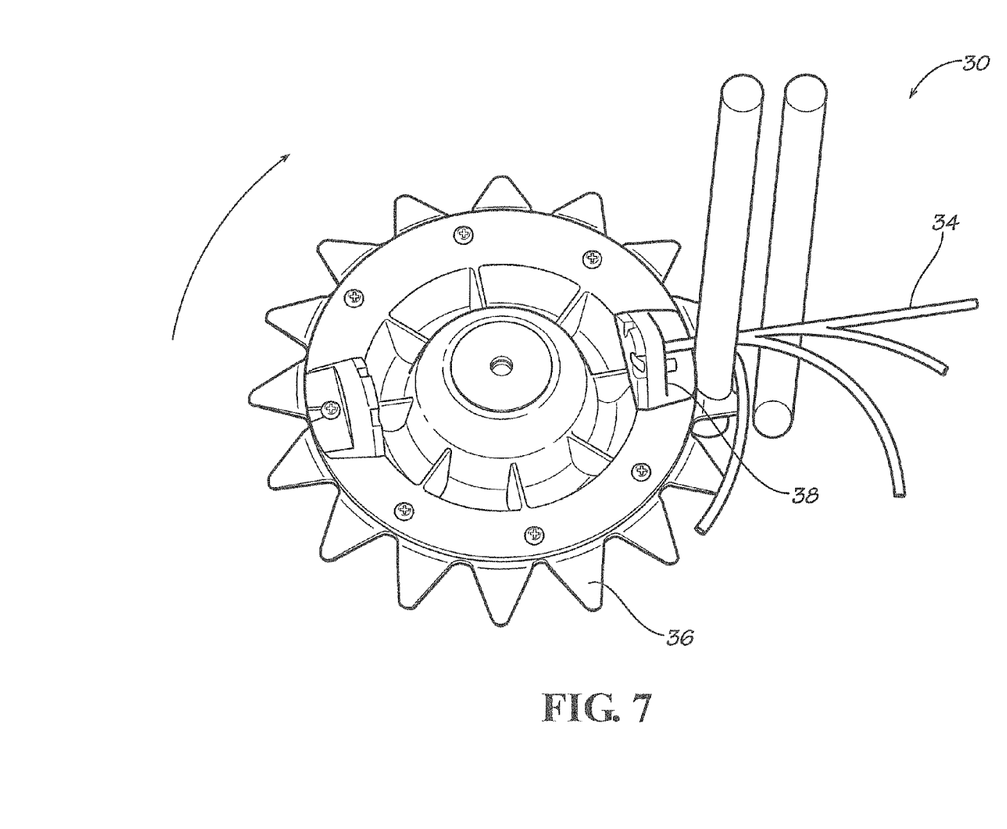
FIG. 7 is a front elevational view of the cutting head of FIG. 2 showing the tail whip effect according to an embodiment of the present invention.

Referring to FIG. 7, shown is a front elevational view of the cutting head of FIG. 2 showing the tail whip effect.

Figure 8:
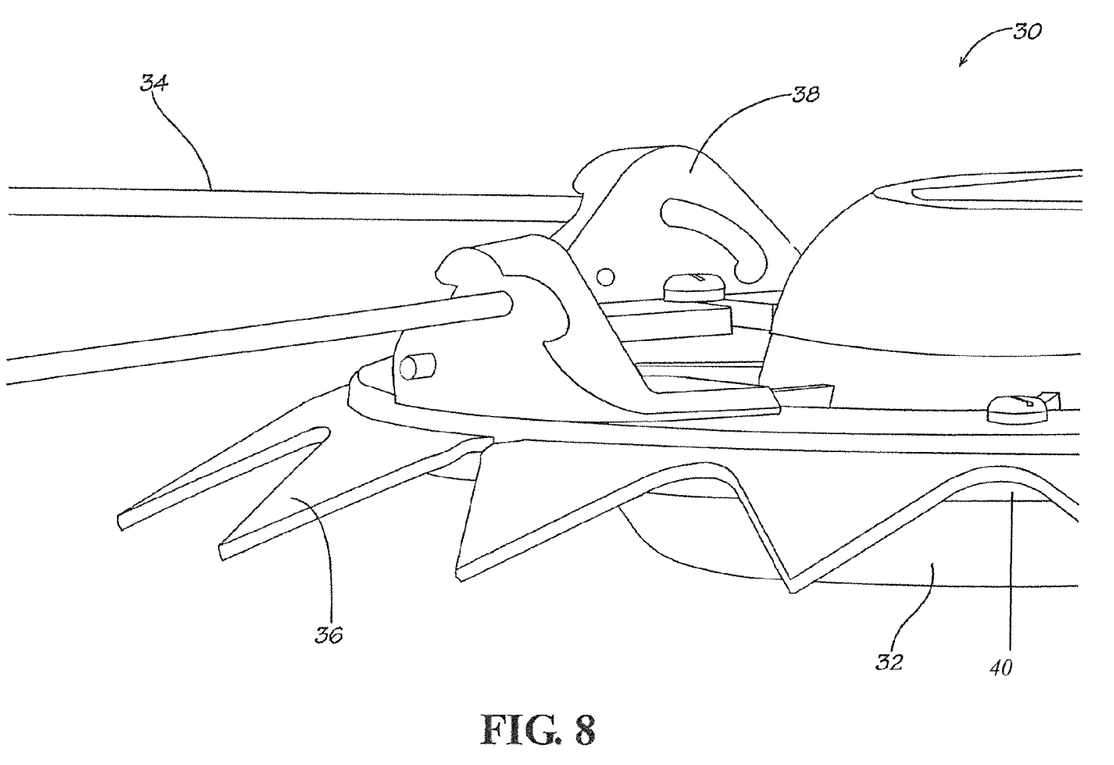
FIG. 8 is a partial side view of the cutting head of FIG. 2 showing string trimmer mounts according to an embodiment of the present invention.

Referring to FIG. 8, shown is a partial side view of the cutting head of FIG. 2 showing trimmer mounts.

Figure 9:
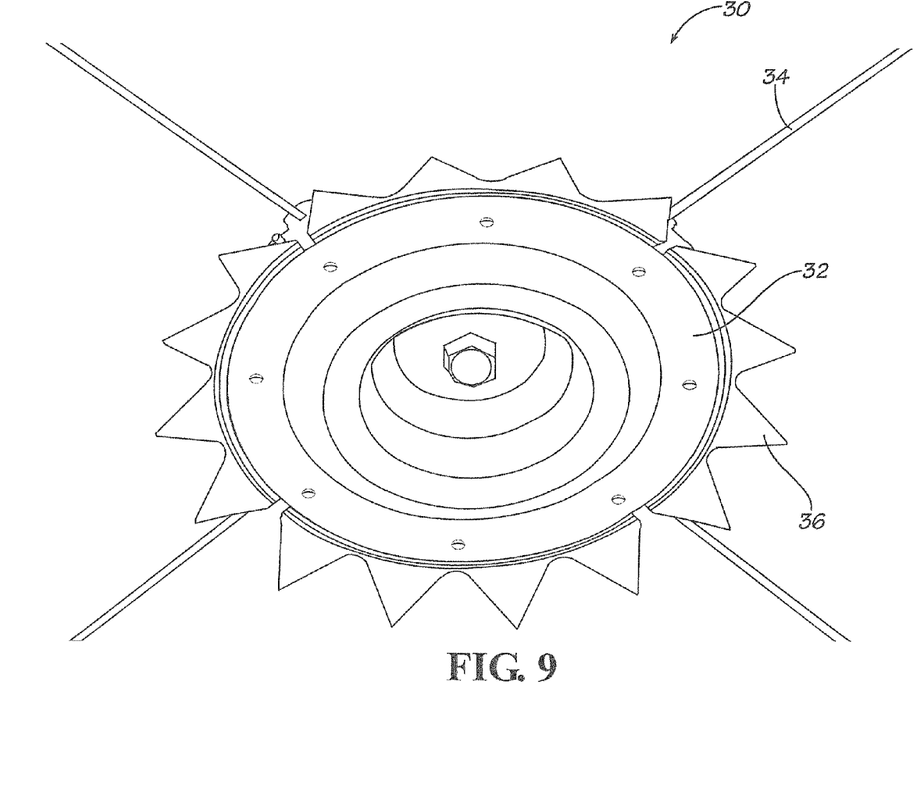
FIG. 9 is a front elevational view of the cutting head of FIG. 2 wherein the bowl is inverted according to an embodiment of the present invention.

Referring to FIG. 9, shown is a front elevational view of the cutting head of FIG. 2 wherein the bowl is inverted according to an embodiment of the present invention.

Figure 10:
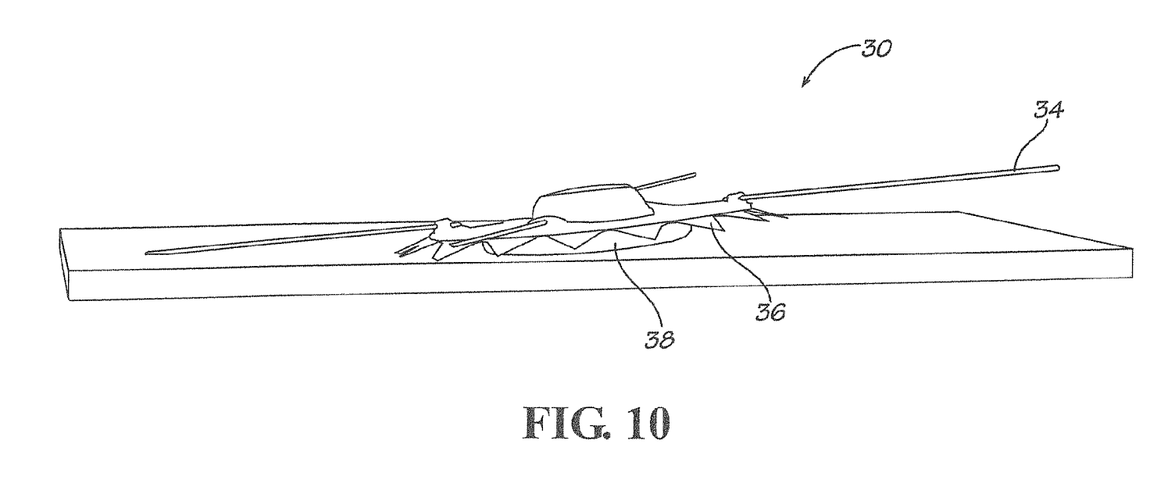
FIG. 10 is a side view of a cutting head of FIG. 2 showing the bowl acting as a fulcrum to control the downward angle of the blades according to an embodiment of the present invention.

Referring to FIG. 10, shown is a side view of a cutting head of FIG. 2 showing the bowl acting as a fulcrum to control the downward angle of the blades.

While the invention has been described in detail with reference to preferred embodiments, it is understood that variations and modifications thereof may be made without departing from the true spirit and scope of the invention.

What is claimed is:

1. A cutting head for a string trimmer, the cutting head being rotationally driven through a drive shaft, the cutting head comprising:
    a bowl;
    at least one trimmer string secured to the bowl;
    at least one blade attached to an outer circumference of the bowl, the at least one blade being angled downward away from the at least one trimmer string; and
    a removable attachment attached to the outer circumference of the bowl, the removable attachment including the at least one blade extending therefrom;
    wherein the removable attachment is disc-shaped and surrounds an opening, and wherein a portion of the bowl extends through the opening of the removable attachment and below the removable attachment.

2. The cutting head of claim 1, further comprising at least one trimmer string mount, the trimmer string mount being secured to the top surface of the bowl and including at least one hole for attachment of the trimmer string a vertical distance above the top surface of the bowl, the trimmer string mount positioned to operate as an agitator for dispersing vegetation.

3. The cutting head of claim 1, wherein tilting the bowl adjusts the downward angle of the blades, and the height of the bowl raises the blades a distance above a cutting surface.

4. The cutting head of claim 1, wherein the blade is composed of a spark free material.

5. The cutting head of claim 1, wherein the blade is composed of stainless steel.

6. The cutting head of claim 1, wherein the blade is removable.

7. The cutting head of claim 1, wherein the blade is interchangeable.

8. The cutting head of claim 1, wherein the blade is coated with ceramic wear resistant coating.

9. The cutting head of claim 1, wherein the trimmer string is composed of nylon.

10. The cutting head of claim 1, wherein the trimmer string is secured to the top surface of the outer diameter of the bowl.

11. The cutting head of claim 1, wherein the trimmer string is secured to the bottom surface of the outer diameter of the bowl.

12. The cutting head of claim 1, wherein the trimmer string and the blade cut a single piece of vegetation together.

13. The cutting head of claim 1, further comprising a bottom fastener ring for clamping the blade between the outer circumference of the bowl and the bottom fastener ring.

14. The cutting head of claim 1, wherein the removable attachment has an outer diameter and the at least one blade extends from the outer diameter of the removable attachment.

15. The cutting head of claim 1, wherein the bottom fastener ring includes an opening at least in part co-extensive with the opening of the removable attachment, and wherein the portion of the bowl extending through the opening of the removable attachment extends through the opening of the bottom fastener ring and below the bottom fastener ring.

* * * * *